(12) United States Patent
Bretl et al.

(10) Patent No.: US 7,327,790 B1
(45) Date of Patent: Feb. 5, 2008

(54) MPEG ON SCREEN DISPLAY CODER FOR DTV INTERFACES

(75) Inventors: Wayne E. Bretl, Schaumburg, IL (US); Mark Fimoff, Hoffman Estates, IL (US); Paul A. Snopko, Chicago, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/330,769

(22) Filed: Jun. 11, 1999

Related U.S. Application Data

(60) Provisional application No. 60/089,482, filed on Jun. 16, 1998.

(51) Int. Cl.
*H04N 7/18* (2006.01)
(52) U.S. Cl. .............................. 375/240.26; 375/240.28
(58) Field of Classification Search ................. 375/240.01–240.29; 348/10–13
See application file for complete search history.

(56) References Cited

U.S. PATENT DOCUMENTS

| | | | | | |
|---|---|---|---|---|---|
| 5,650,825 | A | * | 7/1997 | Naimpally et al. | 348/465 |
| 5,894,320 | A | * | 4/1999 | Vancelette | 725/138 |
| 5,917,830 | A | * | 6/1999 | Chen et al. | 370/487 |
| 6,005,629 | A | * | 12/1999 | Douche et al. | 375/240.26 |
| 6,078,328 | A | * | 6/2000 | Schumann et al. | 345/418 |
| 6,115,080 | A | * | 9/2000 | Reitmeier | 348/564 |
| 6,758,540 | B1 | * | 7/2004 | Adolph et al. | 375/240.26 |

* cited by examiner

*Primary Examiner—Andy Rao*

(57) ABSTRACT

An MPEG on-screen display coder includes a buffer, an MPEG encoder, and a multiplexer. The buffer receives and buffers an MPEG transport data stream containing frames of a selected program and frames of a non-selected program. The MPEG encoder encodes frames of the selected program with an on-screen display. The multiplexer selectively passes to a digital television receiver the frames of the non-selected program, the encoded frames of the selected program, and original frames of the selected program.

43 Claims, 10 Drawing Sheets

MPEG ON SCREEN DISPLAY CODER FOR DTV INTERFACES

RELATED PROVISIONAL APPLICATION

The present application claims priority from Provisional Application Ser. No. 60/089,482 filed Jun. 16, 1998.

TECHNICAL FIELD OF THE INVENTION

The present invention relates to coding MPEG on-screen displays for digital television interfaces.

BACKGROUND OF THE INVENTION

On screen display graphics generators for analog televisions are well understood and are widely used. Almost every analog television sold has the capability to overlay informational displays on top of the received video. Additionally, accessory devices such as VCR's, cable set top boxes, and satellite set top boxes can overlay display information on top of a received or locally generated video signal.

Digital televisions, however, are intended to receive and process digital television signals. Such digital television signals are in the form of MPEG-2 encoded digital video transport streams (see ISO/IEC 13818-1 and ISO/IEC 13818-2). MPEG-2 encoded digital video transport streams may also be received by a digital accessory device from digital satellites, digital cable broadcast systems, or terrestrial digital broadcast systems, or may be produced by an accessory DVD player or digital VCR. The digital stream received by a digital accessory device is then fed to a digital television receiver. If the accessory device is to create informational displays to be overlaid or otherwise mixed with the original MPEG-2 encoded video, and then send that video plus the display information as an MPEG-2 encoded transport stream to a digital television, new techniques of overlaying on-screen displays on video are required. The present invention is directed to such new techniques.

SUMMARY OF THE INVENTION

In accordance with one aspect of the present invention, an MPEG on-screen display coder comprises an on-screen display turn on device and an MPEG encoder. The on-screen display turn on device is arranged to provide an output when an on-screen display is to be turned on. The MPEG encoder is arranged to encode frames with the on-screen display in response to the output of the on-screen display turn on device.

In accordance with another aspect of the present invention, an MPEG on-screen display coder comprises an MPEG encoder and a multiplexer. The MPEG encoder is arranged to encode frames of a selected program with an on-screen display. The multiplexer is arranged to replace original frames with the encoded frames for supply to a digital television receiver.

In accordance with yet another aspect of the present invention, an MPEG on-screen display coder comprises a buffer, an MPEG encoder, and a multiplexer. The buffer is arranged to receive and buffer an MPEG transport data stream containing frames of a selected program and frames of a non-selected program. The MPEG encoder is arranged to encode frames of the selected program with an on-screen display. The multiplexer is arranged to selectively pass to a digital television receiver the frames of the non-selected program, the encoded frames of the selected program, and original frames of the selected program.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
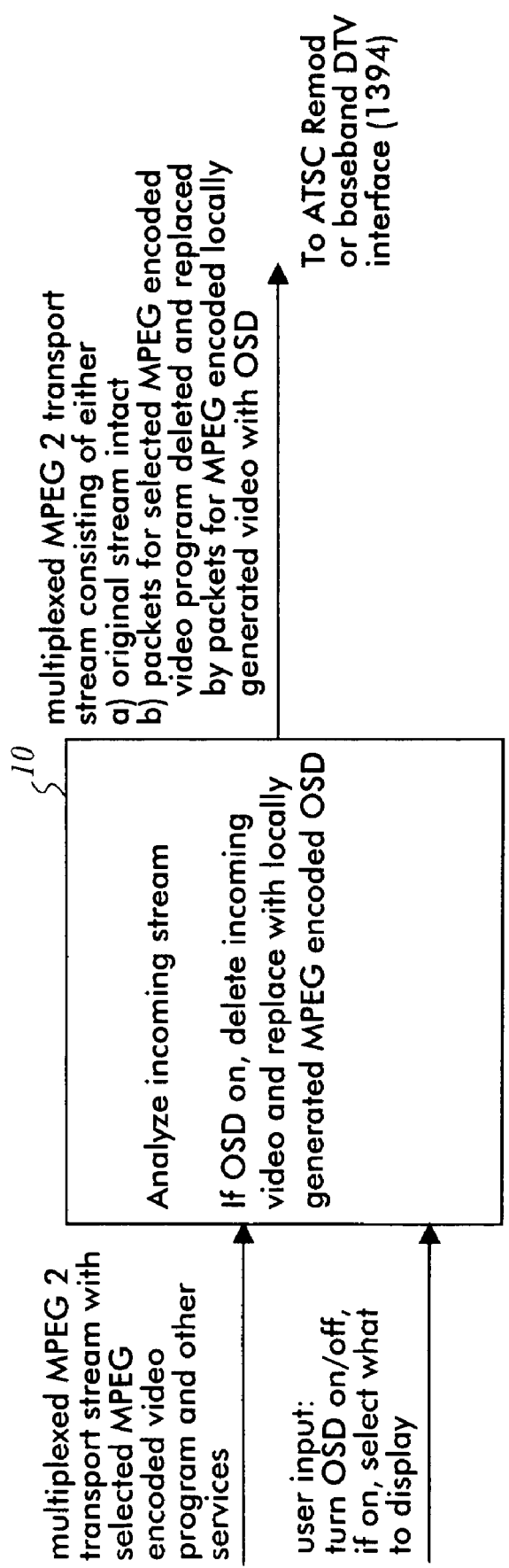
FIG. 1 is an overview block diagram of an MPEG on-screen display coder in accordance with the present invention.

Several MPEG on-screen display coders are described below. As shown in FIG. 1, these coders are generally represented by the reference numeral 10 and process an input MPEG-2 transport stream containing transport packets for a selected MPEG encoded video program. This selected MPEG encoded video program may be multiplexed with other programs and/or services generally referred to herein as other programs or as non-selected programs. The input MPEG transport stream is usually received from a set top box, a digital tape or disc player, or another device for which an MPEG on-screen display coder provides the capability of on-screen display. The input MPEG transport stream is processed by the MPEG on-screen display coder 10 so that an on-screen display appears on the screen of a digital television that is used to view the video program.

When the on-screen display is not selected by a user, the output of the MPEG on-screen display coder 10 comprises the original intact transport stream. However, when the on-screen display is selected by the user, the output of the MPEG on-screen display coder 10 comprises a transport stream in which the transport packets containing the selected MPEG encoded video have been deleted and replaced by packets containing locally generated MPEG video as selected by the user or as automatically generated by a host device.

The output of the MPEG on-screen display coder 10 is intended to be supplied, for example, to either an ATSC VSB modulator (such as may be contained in a VCR) which feeds a digital television or directly to the digital television by way of a baseband interface such as an IEEE 1394 baseband interface. The locally generated MPEG video comprises either a static colored background overlaid with on-screen display graphics generated by closed caption data (disclosed below in the section designated Level 1), or alternatively a background derived from the original video overlaid with on-screen display graphics where the graphics are directly encoded into the video (disclosed below in the section designated Level 2).

The turn on and turn-off of the locally generated MPEG on-screen display video can be controlled automatically or manually by the user. The transport stream processing generally described above must be done in such a way that the digital television's MPEG video decoder behaves well in response to the turn on and turn off of the locally generated video. By constraining the size of the locally encoded frame(s), for example, the digital television's MPEG video decoder can be made to behave well in response to the turn on and turn off of the locally generated video. "Size" of an encoded frame refers to the amount of data in an encoded frame, not the spatial dimensions of the video frame.

A third category of MPEG on-screen display coder is also described below. This MPEG on-screen display coder utilizes an MPEG downsampling decoder to create a small video window overlaid on the full screen on-screen display graphics.

Level 1

In Level 1, the Advanced Television Closed Captioning standard (EIA-IS 708) is utilized. This standard provides for the insertion of encoded closed caption data into the MPEG-2 compressed video data stream at the picture layer level. This standard provides for the periodic insertion of additional Program Map Table (PMT) packets into the data stream in order to provide a service descriptor. (PMT packets are provided in the MPEG standard as a means of identifying the various data packets, such as video, audio, and closed caption packets, that belong to a program.) The service descriptor includes a language code and other service attributes for the closed caption data.

A Level 1 MPEG on-screen display coder basically operates by removing all of the original video packets for the selected video program from the input MPEG transport stream. Packets of data for other non-selected programs that may be present in the transport stream may be left intact or may be modified by the same techniques to be described below, as needed for a particular application. Then, a simplified MPEG video encoder encodes a series of frames comprising a solid colored background with the addition of closed caption data in order to create an on-screen display selected by the user or by automatic operation of the set-top box or other host device. This locally encoded MPEG video is placed into transport packets and these packets are multiplexed into the transport stream at the locations vacated by the original data packets which have been deleted.

Two ways of accomplishing this result are described below. In Level 1a, the locally generated MPEG video has a time base that is completely independent of that of the original video that was deleted. In Level 1b, the locally generated MPEG video is effectively slaved to the timing of the original video that was deleted. Level 1a requires that the MPEG decoder in the digital television receiver be well-behaved under conditions of buffer underflow. Level 1b is more generally applicable to a wide range of decoders.

Level 1a

Figure 2:
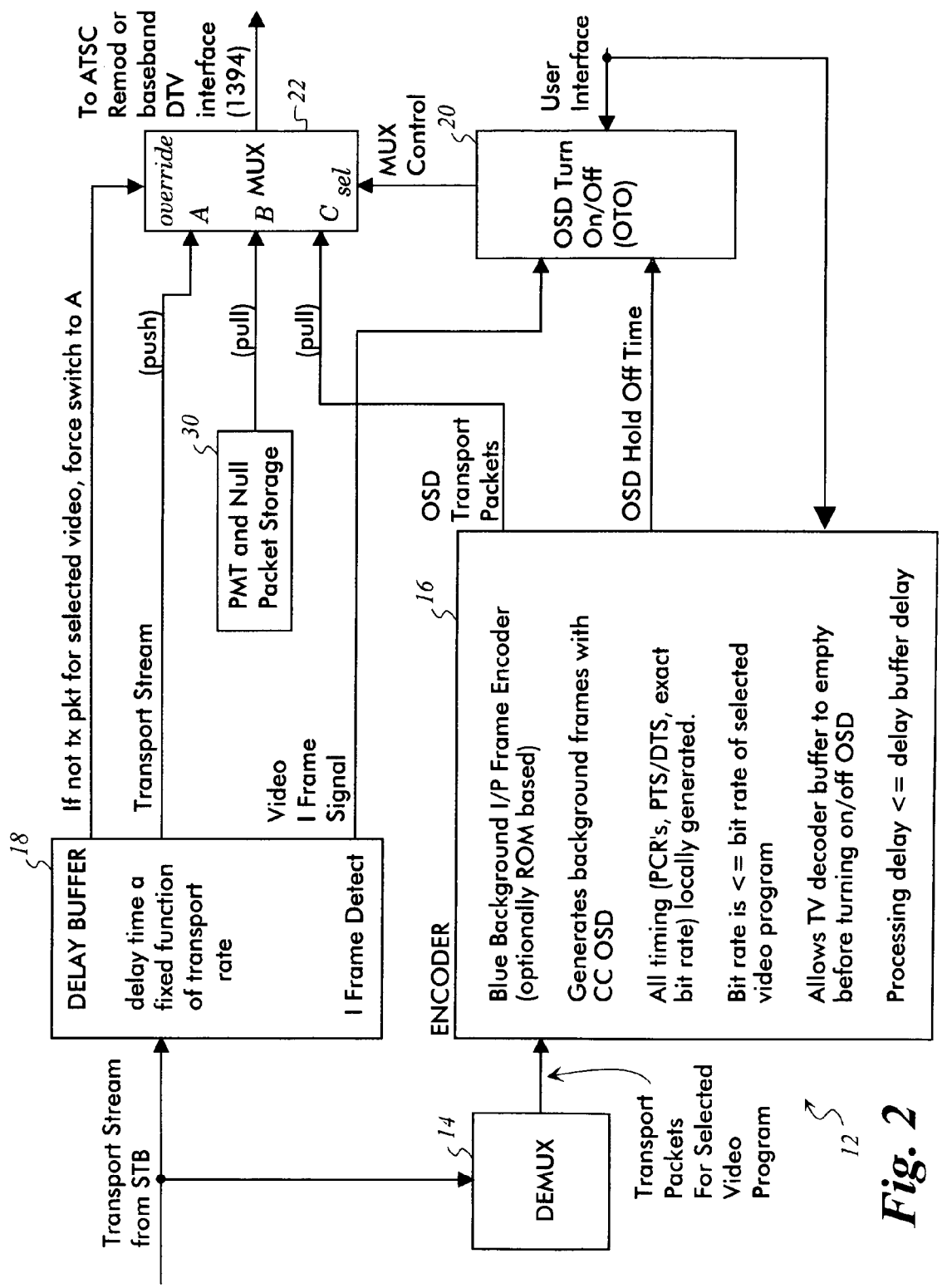
FIGS. 2 and 3 illustrate a first embodiment of an MPEG on-screen display coder in accordance with the present invention.

FIG. 2 shows an MPEG on-screen display coder 12 as a first embodiment of the MPEG on-screen display coder 10. As shown in FIG. 2, the transport stream is received such as from a set-top box and is fed to a demultiplexer 14 of the MPEG on-screen display coder 12. The demultiplexer 14 extracts only the transport packets for a video program selected manually by a user or selected automatically. The output of the demultiplexer 14 is fed to an encoder 16.

The transport stream is also fed to a delay buffer 18 which imparts a delay time to the transport stream that is greater than or equal to the processing time of the encoder 16. The delay buffer 18 can detect a transport packet that contains the start of an I frame, and signal the start of the I frame to an on-screen display turn on/off sync block 20 by way of a video I frame marker. The delay buffer 18 also outputs the transport stream to an input A of a multiplexer 22. Moreover, the delay buffer 18 sends a control signal to an override input of the multiplexer 22 (one of two multiplexer control lines) in order to indicate whether each transport packet is a video packet of the selected program.

Figure 3:
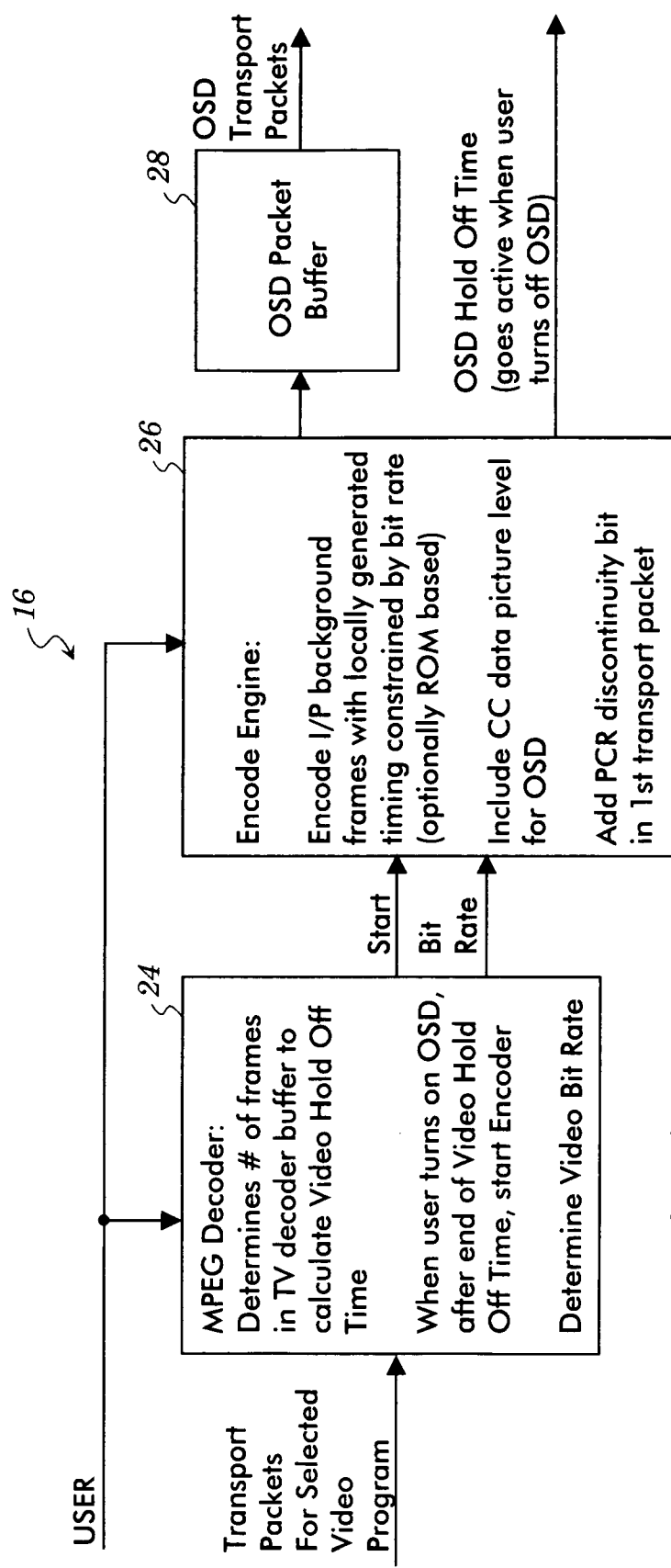

The encoder 16, shown in FIG. 2 and in more detail in FIG. 3, contains an MPEG decoder 24 and an MPEG encode engine 26. The MPEG decoder 24 partially decodes the original selected video in order to determine the number of frames that is currently resident in the digital television's decoder buffer. For this purpose, the digital television's decoder buffer can easily be modeled in the MPEG decoder 24 using well known methods explained in the MPEG standard. After an on-screen display turn on is requested by the user or automatically, the MPEG decoder 24 within the encoder 16 determines the fullness of the digital television's decoder buffer in order to wait enough time (which may be referred to as the video hold off time) for the digital television's decoder buffer to empty, then the MPEG decoder 24 starts the MPEG encode engine 26. The video hold off time is needed, as explained below, to properly turn on the on-screen display without risking overflow of the digital television's decoder buffer.

The MPEG encode engine 26, in response to the start instruction from the MPEG decoder 24, generates a series of transport packets containing MPEG encoded solid color backgrounds along with picture level closed caption data encoded to provide the desired on-screen display as selected by the user or automatically.

After encoding begins, the first frame is an I frame and is followed by a series of P frames. It should be noted that the first generated P frame can be perfectly predicted from the generated I frame, and any subsequent P frames can each be perfectly predicted from its preceding P frame by setting all residuals and motion vectors equal to zero. The locally encoded video has its own time base (the locally generated program clock reference, PCR, and presentation time stamp, PTS) independent from the time base of the original deleted video. The MPEG video layer encoding of the solid color background I frame and subsequent P frames (all of these P frames are identical) can be simplified by storing in ROM only two fully compressed frames (the I frame and one P frame), which are already encoded at a theoretically minimum size. Groups of frames each comprising the I frame followed by a predetermined number of iterations of the P frame are repeatedly output during the interval of on-screen display.

The MPEG encode engine 26 puts this generated video into on-screen display transport packets and feeds an on-screen display packet buffer 28 from which these on-screen display transport packets are read by the multiplexer 22 at an input C when needed. The MPEG encode engine 26 models the activity of the digital television's decoder buffer as discussed above so that the MPEG encode engine 26 is always aware of the number of on-screen display frames in the digital television's decoder buffer. The number of on-screen display frames in the digital television's decoder buffer is used by the MPEG encode engine 26 to calculate an on-screen display hold off time which is the amount of time it would take the digital television's decoder buffer to empty if no more on-screen display video packets were sent. The on-screen display hold off time is used, as explained below, to properly turn off the on-screen display and return to original video without risking overflow of the digital television's decoder buffer. The on-screen display hold off time is fed to the on-screen display turn on/off sync block 20.

The first PCR packet generated by the MPEG encode engine 26 after an on-screen display turn on is requested by the user or generated automatically has its PCR discontinuity bit set to tell the digital television's decoder that the time base is changing.

The multiplexer 22 multiplexes the original transport stream at the input A with null packets and Program Map Table packets at an input B and on-screen display transport packets at the input C. The null packets and Program Map Table packets are supplied by a memory 30, and the on-screen display transport packets are supplied by the encoder 16. When on-screen display is requested by the user or automatically, a multiplexer control input from the on-screen display turn on/off sync block 20 selects the input C. As a result, the multiplexer 22 reads on-screen display packets from the on-screen display packet buffer 28 of the encoder 16. If the on-screen display packet buffer 28 is empty, the multiplexer 22 automatically selects the input B and thus reads null packets (or an occasional Program Map Table packet) from the memory 30.

It is intended that only video packets for the selected program be deleted from the original transport stream to be replaced by on-screen display packets, null packets, and Program Map Table packets as described. Therefore, the delay buffer 18 provides an override signal to the multiplexer 22 if the transport packet to be output by the delay buffer 18 is not a video packet for the selected program (because the transport packet currently being output by the delay buffer 18, for example, is an audio packet, a video packet from another program, or some other data packet that is desirable to retain). Thus, the override signal from the delay buffer 16 forces the multiplexer 22 to select the input A.

Accordingly, it can be seen that, if the on-screen display is turned on, the MPEG on-screen display coder 12 passes all original transport packets except those of the selected video program which are replaced by on-screen display packets, null packets, and Program Map Table packets. If the on-screen display is turned off, the multiplexer 22 always connects the input A to its output.

The following sequence of events is required to properly turn on the on-screen display so as to keep the digital television's decoder well behaved by allowing underflow but never overflow: (1) an on-screen display turn on request is signaled to the encoder 16 and to the on-screen display turn on/off sync block 20 by the user or automatically; (2) the on-screen display turn on/off sync block 20 signals the multiplexer 22 to select the input B (null packets); (3) the on-screen display turn on/off sync block 20 monitors the on-screen display packet buffer 28 and switches to the input C when packets are available. These packets will be available after the video hold time has expired and the MPEG decoder 24 with the encoder 16 has signaled the MPEG encode engine 26 to start. This procedure allows the digital television's decoder buffer to briefly underflow, typically precipitating a freeze frame just before the on-screen display appears. This procedure also prevents overflow of the digital television's decoder buffer.

The following sequence of events is required to properly turn on the on-screen display so as to keep the digital television's decoder well behaved by allowing underflow but never overflow: (1) an on-screen display turn on request is signaled to the encoder 16 and to the on-screen display turn on/off sync block 20 by the user or automatically; (2) the on-screen display turn on/off sync block 20 signals the multiplexer 22 to select the input B (null packets); (3) the on-screen display turn on/off sync block 20 monitors the on-screen display packet buffer 28 and switches to the input C when packets are available. These packets will be available after the video hold time has expired and the MPEG decoder 24 with in the encoder 16 has signaled the MPEG encode engine 26 to start. This procedure allows the digital television's decoder buffer to briefly underflow, typically precipitating a freeze frame just before the on-screen display appears. This procedure also prevents overflow of the digital television's decoder buffer. The next received original video frame will be an I frame.

Level 1b

Figure 4:
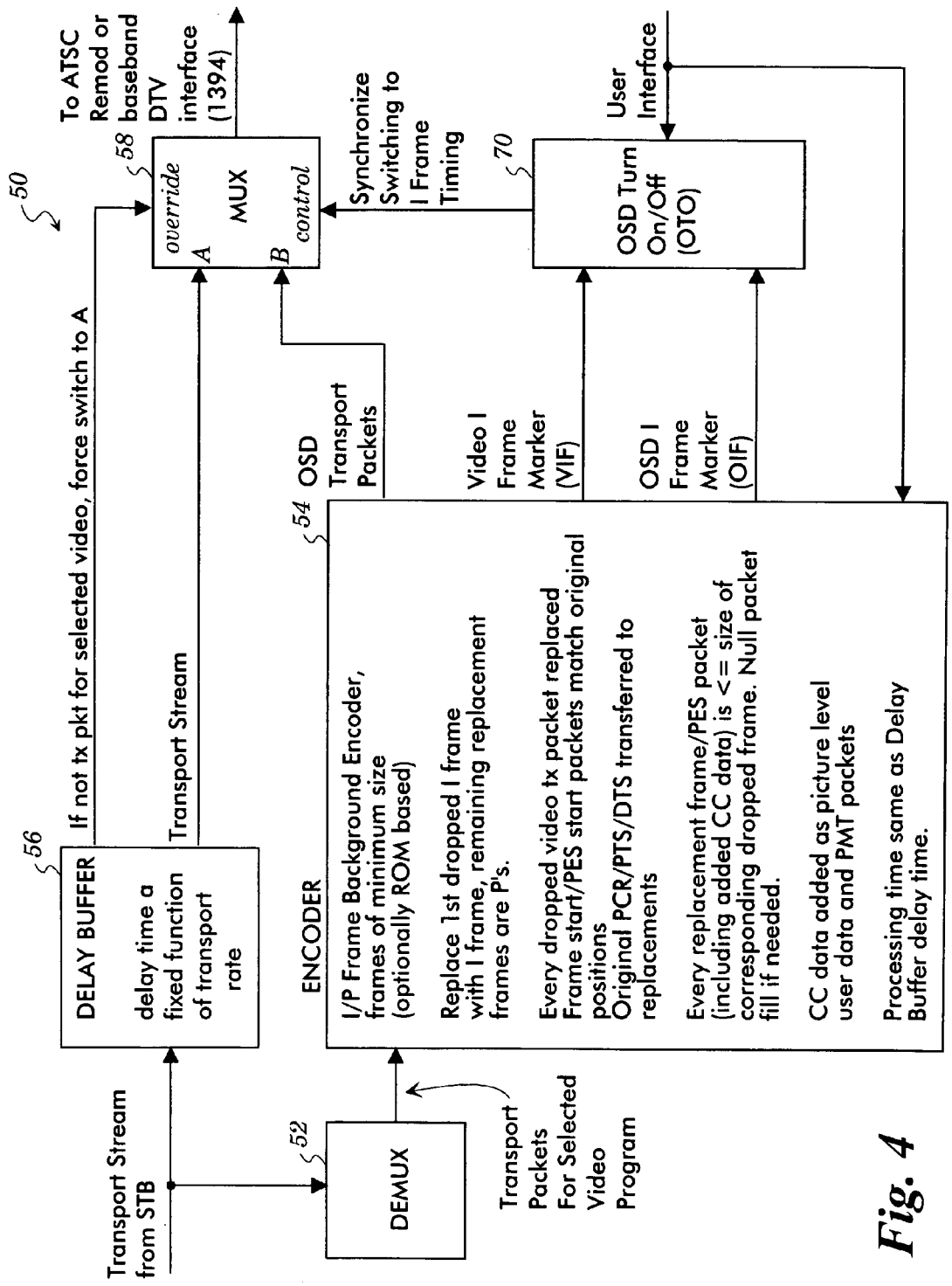
FIGS. 4 and 5 illustrate a second embodiment of an MPEG on-screen display coder in accordance with the present invention.

FIG. 4 shows an MPEG on-screen display coder 50 as a second embodiment of the MPEG on-screen display coder 10. As shown in FIG. 4, the transport stream is received such as from a set-top box and is fed to a demultiplexer 52 of the MPEG on-screen display coder 50. The demultiplexer 52 extracts only the transport packets for a video program selected manually by a user or selected automatically. The output of the demultiplexer 52 is fed to an encoder 54. The transport stream is also fed to a delay buffer 56 which imparts a constant delay time to the transport stream that is equal to the processing time of the encoder 54. The delay buffer 56 outputs the transport stream to an input A of a multiplexer 58. The delay buffer 56 also sends a control signal to a multiplexer override input of the multiplexer 58 (one of two multiplexer control lines) in order to indicate whether each transport packet is a video packet of the selected program.

Figure 5:
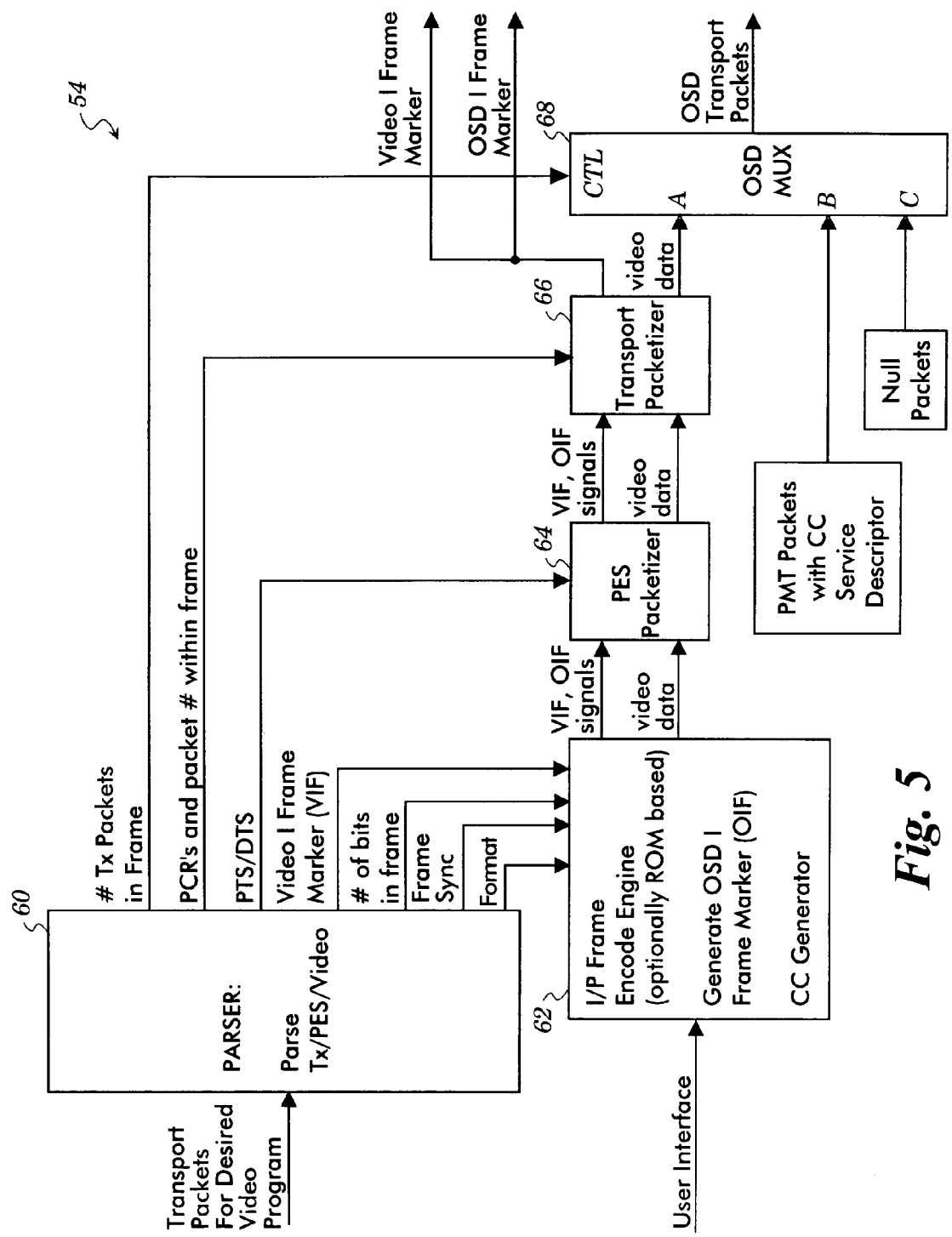

The encoder 54, shown in FIG. 4 and in more detail in FIG. 5, generates a series of transport packets containing MPEG encoded solid color backgrounds along with picture level closed caption data encoded to provide the desired on-screen display as selected by the user or generated automatically. This data may be referred to herein as on-screen display transport packets. After encoding begins, a parser 60 of the encoder 54 detects the next I frame which is followed by a series of P frames to be encoded at either a theoretically minimum size, or in a manner constrained by the number of bits in the deleted original video frame, so that the size of the locally generated MPEG video frame is smaller than or equal to the size of the original deleted video frame.

It should be noted that the first generated P frame can be perfectly predicted from the generated I frame, and any subsequent P frames can each be perfectly predicted from its preceding P frame by setting all residuals and motion vectors equal to zero. The MPEG video layer encoding of the solid color background I frame and subsequent P frames (all of these P frames are identical) can be simplified by storing in ROM only two fully compressed frames (the I frame and one P frame), which are already encoded at a theoretically minimum size. Groups of frames each comprising the I frame followed by a predetermined number of iterations of the P frame are repeatedly output during the interval of on-screen display.

The time base (PCR/PTS) from the original deleted video is transferred to the locally generated video. It should be noted that any decoding time stamps (DTS's) can be ignored because the encoder 54 in the MPEG on-screen display coder 50 does not encode any B frames. Each deleted original video transport packet is replaced by a locally generated video transport packet. If the deleted original video transport packet is also a PCR packet, the PCR value is transferred to the replacement packet. Thus, the locally encoded video has its own time base generated from the original deleted video as described below. Every deleted packetized elementary stream (PES) packet (video frame) is replaced by a corresponding locally generated PES packet (video frame) with the same PTS. Each locally generated replacement encoded frame has the same size (same number of bits) or a smaller size as the original frame it replaces. Null packets and Program Map Table packets are added to each replacement frame so that there are effectively the same number of transport packets in each replacement frame as in its corresponding original frame.

As shown in FIG. 5, the encoder 54 includes the parser 60 that parses the original video packets in order to provide the illustrated outputs. An entire frame must be parsed to provide these outputs. At the end of parsing a frame, a frame sync signal is sent to an MPEG encode engine 62 causing it to encode an on-screen display frame If an on-screen display turn on has just been requested, then an I frame is generated, otherwise a P frame is generated. If an I frame is generated, an on-screen display I frame marker (OIF) is signaled on the VIF,OIF signals line and is propagated through the system as shown for later use. The on-screen display I frame marker is not used within the encoder 54. A video I frame marker (VIF) from the parser 60 indicates whether the original video frame just parsed is an I frame. The video I frame marker is also not used within the encoder 54, but is propagated through the system for later use. (The MPEG encode engine 62 may optionally use a format signal to match the on-screen display frame format to that of the original video.)

The output of the MPEG encode engine 62 comprises MPEG video data, the video I frame marker, and the on-screen display I frame marker. The MPEG encode engine 62 feeds a PES packetizer 64 which accepts an MPEG video frame from the MPEG encode engine 62 and forms a PES packet using the PTS from the original video PES packet as supplied by the parser 60. The PES packet is fed to a transport packetizer 66 which chops the PES packet into smaller pieces and creates a series of transport packets. If any transport packets for the original video frame are PCR packets, the parser 60 signals which packets in the sequence of packets are PCR packets and also signals the corresponding PCR values of the PCR packets. This information is used by the transport packetizer 66 to create PCR packets that mirror the original PCR packets that were deleted. The on-screen display transport packets for this frame are fed to an input A of an on-screen display multiplexer 68.

The number of transport packets in the original video frame is fed by the parser 60 to the control input of the on-screen display multiplexer 68. The on-screen display multiplexer 68 outputs the on-screen display transport packets. If the number of on-screen transport packets in the locally generated frame is less than the number of packets in the deleted original frame, the on-screen display multiplexer 68 makes up the difference by selecting input C of the on-screen display multiplexer 68 (null packets) or occasionally input B of the on-screen display multiplexer 68 (Program Map Table packets). The encoder 54 sends the on-screen display packets and any required null packets and Program Map Table packets to the input B of the multiplexer 58 of FIG. 4.

Both I frame markers (video and on-screen display) are fed to an on-screen display turn on/off sync block 70. The on-screen display turn on/off sync block 70 also receives from the user (or automatically) a signal requesting on-screen display turn on or turn off. When an on-screen display turn on is requested by the user or automatically, the on-screen display turn on/off sync block 70 waits for the on-screen display I frame marker to become active. When the on-screen display I frame marker becomes active, the on-screen display turn on/off sync block 70 signals the multiplexer 58 to switch to input B. When an on-screen display turn off is requested by the user or automatically, the on-screen display turn on/off sync block 70 again waits for the video I frame marker to become active. When the video I frame marker becomes active, the on-screen display turn on/off sync block 70 signals the multiplexer 58 to switch to input A. It should be noted that the override control input to the multiplexer 58 operates the same as for Level 1a. The hold off times of Level 1a need not be considered in Level 1b because the video time base in Level 1b never changes. The digital television's decoder buffer will not overflow because every replacement frame is smaller that its corresponding deleted original frame.

Level 2

A Level 2 MPEG on-screen display coder differs from a Level 1 MPEG on-screen display coder in that closed caption data is not used to create the on-screen display graphics. The graphics are instead generated automatically or in response to user selection by creating pixel data and overlaying it on the incoming original MPEG video. This combination of original video and overlaid graphics are encoded as MPEG video.

A Level 2a MPEG on-screen display coder basically operates by deleting from the input MPEG transport stream all the original video packets in the P and B frames of the selected video program. The I frames of the selected video program are passed through unchanged. Then, a simplified MPEG video encoder first encodes a P frame predicted from the preceding I frame, with the residuals in the predicted P frame consisting of the overlaid graphics. Each subsequent P frame is perfectly predicted from the previous P frame with the residuals and the motion vectors set equal to zero. These P frames replace the deleted original P and B frames. As in level 1*b*, the locally generated video is effectively slaved to the timing of the original deleted video.

In the Level 2a implementation, the I frames have no overlaid graphics, which may in some case cause a visible flicker. This problem is solved in Level 2b. In Level 2b, the incoming original I frames are partially decoded and overlaid with the graphics selected by the user or automatically. The I frame is then re-encoded with the same quantization, VLC table, and DCT coefficient selection as the original I frame. In this way, the number of bits in the overlaid I frame matches the number of bits in the original I frame. The incoming P and B frames are deleted and replaced by locally generated P frames that are perfectly predicted from the locally generated previous frame with the residuals and the motion vectors set equal to zero.

Level 2a

Figure 6:
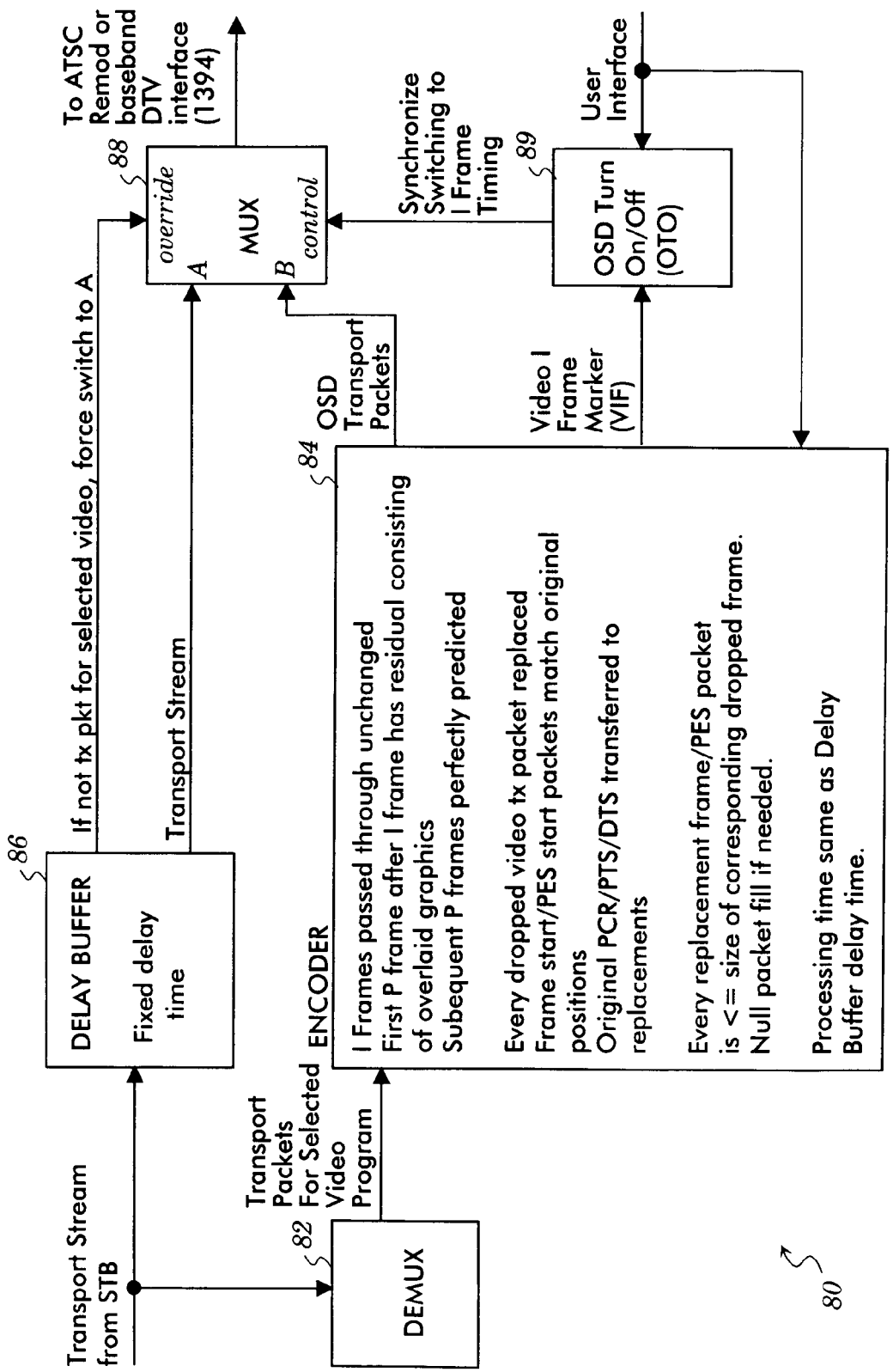
FIGS. 6 and 7 illustrate a third embodiment of an MPEG on-screen display coder in accordance with the present invention.

The Level 2a MPEG on-screen display coder as shown in FIG. 6 is very similar to the Level 1b MPEG on-screen display coder as shown in FIG. 4. The control and synchronization of the on-screen display turn on/off sync blocks and the multiplexers are nearly identical. The principal difference is that the video I frame marker in the Level 2a implementation serves the purpose of both the video I frame marker and the on-screen display I frame marker of the Level 1b implementation because the I frames for both the original video and the on-screen display always coincide, so that a separate on-screen display I frame marker is not needed.

FIG. 6 shows an MPEG on-screen display coder 80 as a third embodiment of the MPEG on-screen display coder 10. As shown in FIG. 6, the transport stream is received such as from a set-top box and is fed to a demultiplexer 82 of the MPEG on-screen display coder 80. The demultiplexer 82 extracts only the transport packets for a video program selected manually by a user or selected automatically. The output of the demultiplexer 82 is fed to an encoder 84. The transport stream is also fed to a delay buffer 86 which imparts a constant delay time to the transport stream that is equal to the processing time of the encoder 84. The delay buffer 86 outputs the transport stream to an input A of a multiplexer 88. The delay buffer 86 also sends a control signal to a multiplexer override input of the multiplexer 88 (one of two multiplexer control lines) in order to indicate whether each transport packet is a video packet of the selected program.

The encoder 84 sends a video I frame marker to an on-screen display turn on/off sync block 89. The on-screen display turn on/off sync block 89 also receives from the user (or automatically) a signal requesting on-screen display turn on or turn off. When on-screen display turn on is requested by the user or generated automatically, the on-screen display turn on/off sync block 89 waits for the video I frame marker to become active. Then, the on-screen display turn on/off sync block 89 signals the multiplexer 88 to switch to an input B. When on-screen display turn off is requested by the user or generated automatically, the on-screen display turn on/off sync block 89 waits for the video I frame marker to become active. Then, the on-screen display turn on/off sync block 89 signals the multiplexer 88 to switch to an input A.

Figure 7:
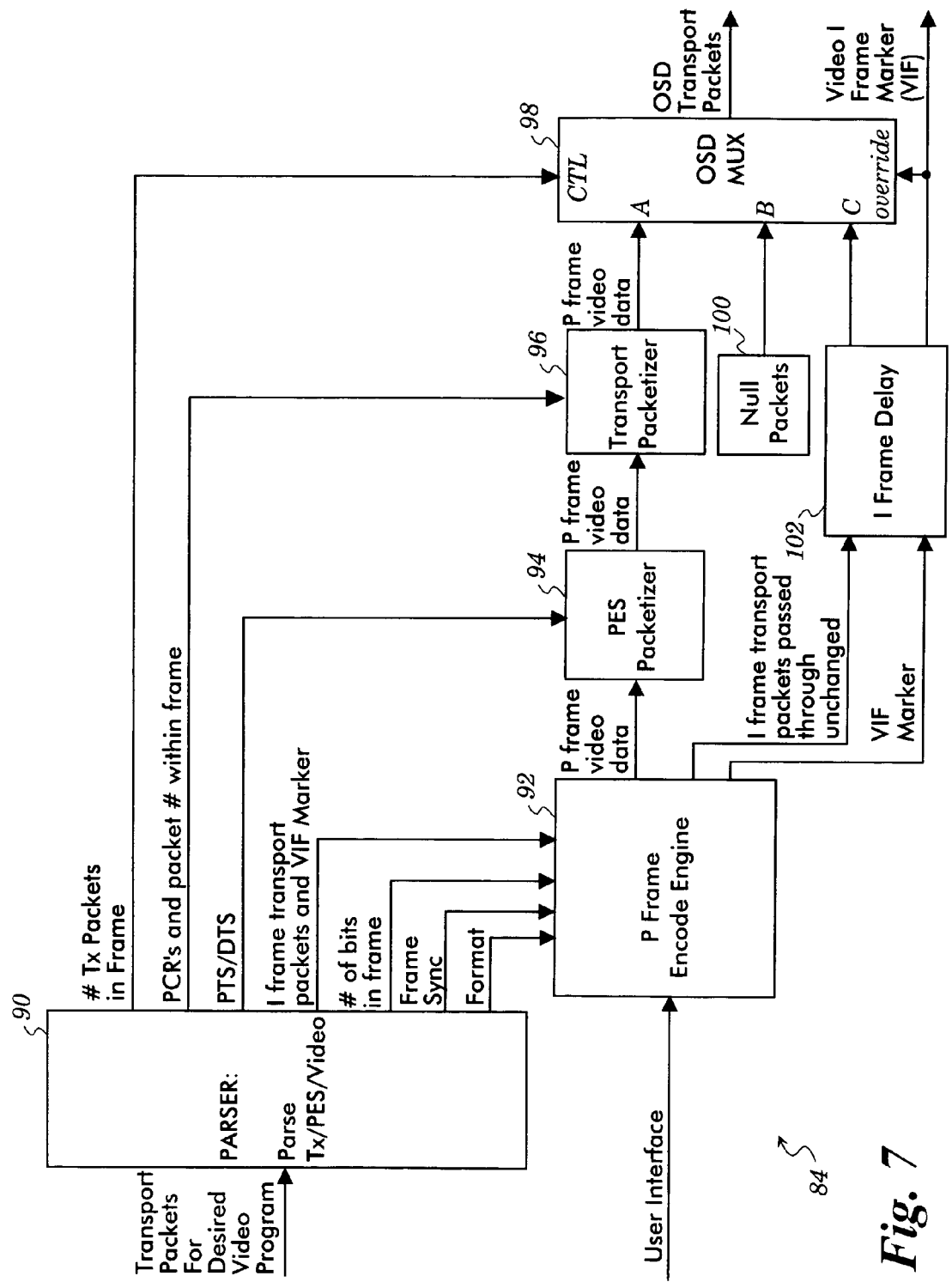

The encoder 84, shown in FIG. 6 and in more detail in FIG. 7, passes the original I frames through unchanged. When an on-screen display is requested by the user or automatically, the encoder 84 continues to pass the original I frames unchanged. The first P frame after the first I frame following the on-screen display turn on has the selected graphics encoded by predicting the P frame from the previous I frame with the graphics encoded as the residuals and with the motion vectors set equal to zero. Subsequent P frames are predicted from previous P frames with the residuals and the motion vectors set equal to zero. Every replacement frame is less than or equal to the size of the original frame it replaces. As mentioned above, the processing time of the encoder 84 is the same as that of the delay buffer 86. The method of transferring the original PCR/PTS information to the locally generated MPEG video is the same as for Level 1b. Therefore, all timing is slaved to the original video (as in Level 1b).

One difference between the MPEG on-screen display coders 50 and 80 is that a parser 90 (see FIG. 7) of the encoder 84 passes I frame transport packets unchanged to an MPEG encode engine 92 along with a video I frame marker. The MPEG encode engine 92 encodes the P frames as previously explained. Each P frame is made into a PES packet by a PES packetizer 94. The P frame PES packet is divided into a series of transport packets by a transport packetizer 96. The P frame transport packets are fed to an input A of an on-screen display multiplexer 98. A null packet source 100 feeds null packets to an input B of the on-screen display multiplexer 98.

I For P frames, the number of transport packets in the original deleted video (P or B) frame is fed to the control input of the on-screen display multiplexer 98 by the parser 90. The on-screen display multiplexer 98 outputs the P frame transport packets. If the number of P frame transport packets in the locally generated P frame is less than the number of packets in the deleted original frame, the on-screen display multiplexer 98 makes up the difference by selecting the input B in order to fill in with null packets. I frame transport packets output by the MPEG encode engine 92 are fed to an I frame delay block 102 which matches the delay times of the PES packetizer 94 and the transport packetizer 96. The video I frame marker is propagated along with the I frame packets. When an I frame is being output by the I frame delay block 102 (during this time there is no output from the transport packetizer 96), the video I frame marker is fed to the override of the on-screen display multiplexer 98 in order to switch the input C to the output of the on-screen display multiplexer 98.

Level 2b

Figure 8:
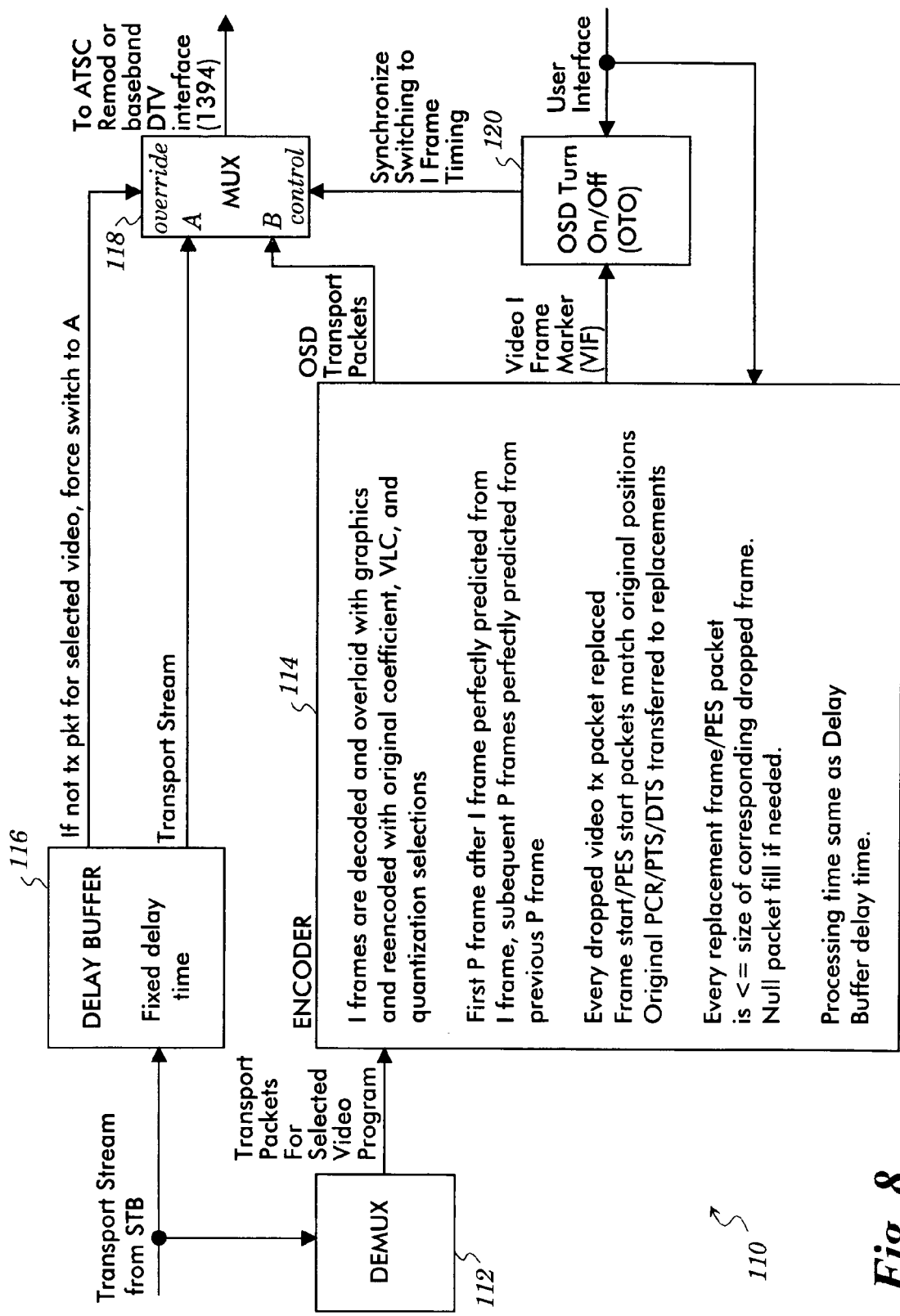
FIGS. 8 and 9 illustrate a fourth embodiment of an MPEG on-screen display coder in accordance with the present invention; and, FIG. 10 illustrates yet another embodiment of an MPEG on-screen display coder in accordance with the present invention.

The Level 2b MPEG on-screen display coder as shown in FIG. 8 is nearly identical to the Level 2a MPEG on-screen display coder as shown in FIG. 6. except that the encoder of the Level 2b MPEG on-screen display coder does not pass the I frame transport packets through unchanged. The I frames are decoded, then overlaid with graphics and re-encoded as MPEG video. The next locally generated frame (a P frame) is perfectly predicted from the I frame. Subsequent P frames are perfectly predicted from the previous P frame.

FIG. 8 shows an MPEG on-screen display coder 110 as a fourth embodiment of the MPEG on-screen display coder 10. As shown in FIG. 8, the transport stream is received such as from a set-top box and is fed to a demultiplexer 112 of the MPEG on-screen display coder 110. The demultiplexer 112 extracts only the transport packets for a video program selected manually by a user or selected automatically. The output of the demultiplexer 112 is fed to an encoder 114. The transport stream is also fed to a delay buffer 116 which imparts a constant delay time to the transport stream that is equal to the processing time of the encoder 114. The delay buffer 116 outputs the transport stream to an input A of a multiplexer 118. The delay buffer 116 also sends a control signal to a multiplexer override input of the multiplexer 118 (one of two multiplexer control lines) in order to indicate whether each transport packet is a video packet of the selected program.

The encoder 114 sends a video I frame marker to an on-screen display turn on/off sync block 120. The on-screen display turn on/off sync block 120 also receives from the user (or automatically) a signal requesting an on-screen display turn on or off. When an on-screen display turn on is requested by the user or automatically, the on-screen display turn on/off sync block-120 waits for the video I frame marker to become active. Then, the on-screen display turn on/off sync block 120 signals the multiplexer 118 to switch to an input B. When an on-screen display turn off is requested by the user or automatically, the on-screen display turn on/off sync block 120 waits for the video I frame marker to become active. Then, the on-screen display turn on/off sync block 120 signals the multiplexer 118 to switch to the input A.

Figure 9:
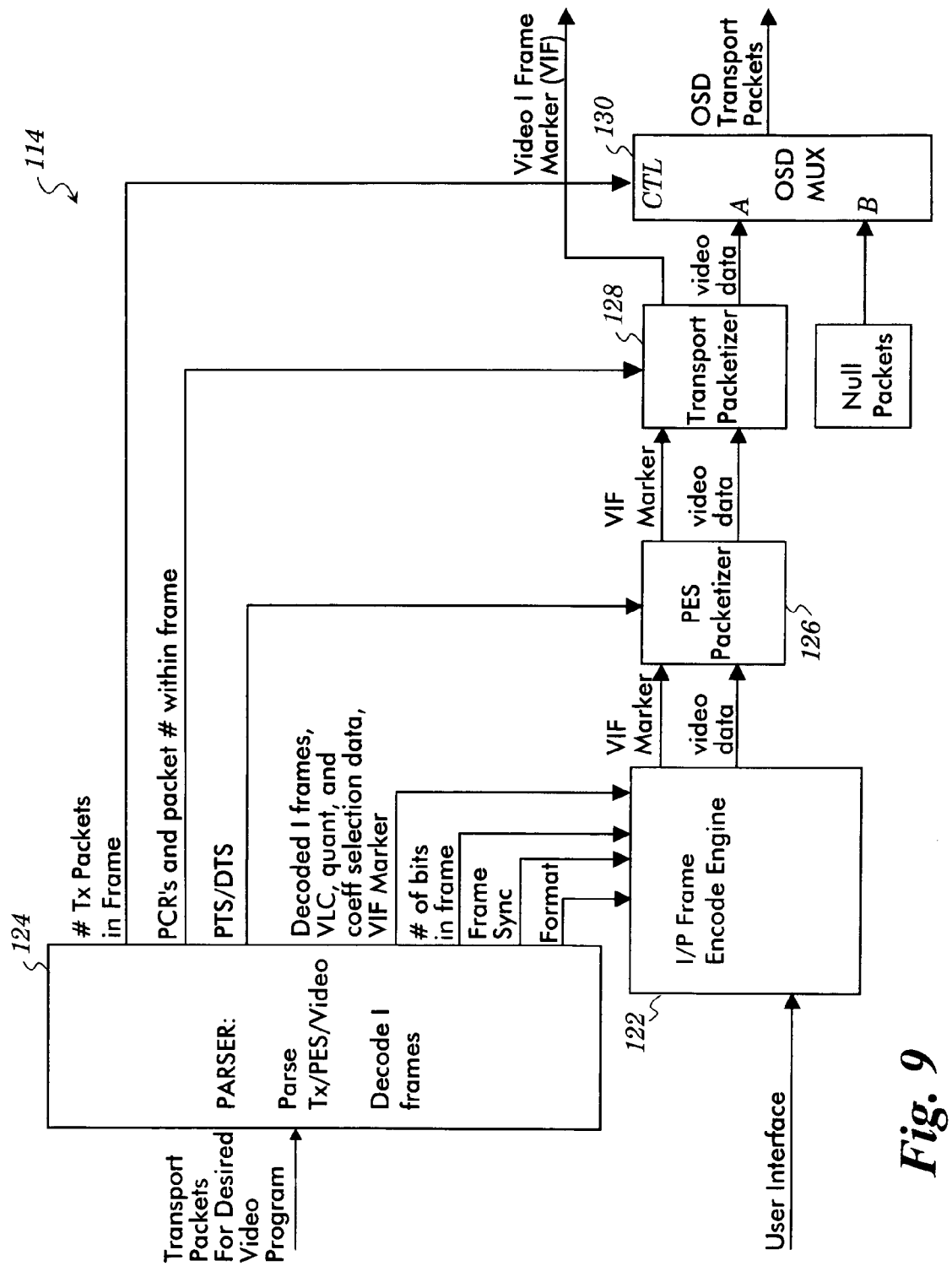

The encoder 114, shown in FIG. 8 and in more detail in FIG. 9 is similar to the encoder 84 shown in FIG. 7 and differs in that an MPEG encode engine 122 receives I frames decoded by a parser 124 and outputs locally encoded I and P frames on a single line ("video data"). Thus, there is no separate line for the I frames and there is no I frame delay block. Within the MPEG encode engine 122, the incoming decoded original I frames are overlaid with the user selected or automatically generated graphics. The I is then re-encoded by the MPEG encode engine 122 with the same quantization, VLC table, and DCT coefficient selection as the original I frame. In this way, there is no degradation of the original video, and the number of bits in the overlaid I frame matches the number of bits in the original I frame. The incoming P and B frames are deleted and are replaced by locally generated P frames that are perfectly predicted from the locally generated previous frame with residuals and motion vectors set equal to zero. All generated P frames are less than or equal in size to the corresponding deleted original frames. This size equalization is achieved by encoding in a manner that is constrained by the number of bits in the deleted frame, or encoding a theoretical minimum size perfectly predicted frame.

The encoder 114 includes a PES packetizer 126, a transport packetizer 128, and an on-screen display multiplexer 130 that operate in the same manner as the PES packetizer 94, the transport packetizer 96, and the on-screen display multiplexer 98 of FIG. 7 except that the on-screen display multiplexer 130 has no input C.

A potential problem occurs as a result of the encoder 114 changing the I frame. If the on-screen display is initially turned off, the final B frame (or frames) of the previous GOP (group of pictures) may use a subsequent I frame in the next GOP for prediction. If an on-screen display turn on is then requested just as this I frame arrives, this I frame will be modified by the graphics overlay. Then, the final B frames(s) of the video without the overlay will not have the expected reference (the subsequent I frame has been modified) for prediction in the decoder of the digital television and will therefore be displayed with errors. A simple solution for the Level 2b MPEG on-screen display coder 110 is to use the Level 2a method for the first GOP after an on-screen display turn on has been requested. In this way, the first original I frame is not altered. Subsequent to the first GOP, the Level 2b method is used.

Other Level 2 Options

In a simplified variation to Level 2, transport layer video packets for I frames are deleted and replaced by locally generated I frames consisting of a solid color background and the desired on-screen display (the original video is not visible as a background). This encoding is constrained by the frame size of the deleted original I frame. Transport layer video packets for B and P frames are also deleted. These frames are replaced by locally generated P frames. The first P frame is predicted from the I frame with the residuals set to zero. Subsequent P frames are predicted from the preceding P frame with the residuals set to zero.

As described, Level 2 (a and b) encodes with all motion vectors equal to zero. In that case, any graphics animation can only occur at the I frame rate. A somewhat more complex encoder could be used that uses non-zero motion vectors for the P frames to efficiently encode animated graphics that can change at the frame rate. Any such encoding would be constrained by the number of bits in each replaced frame.

In a simplified variation to Level 2b, the on-screen display turn on may be selected. The encoder in the MPEG on-screen display coder passes the next I frame through without modification. Subsequently received P frames for this GOP are deleted. The encoder substitutes a first P frame that is perfectly predicted from the I frame. Subsequent P frames are perfectly predicted from preceding P frames. These operations will have the effect of lowering the buffer occupancy in the digital television receiver. Then, the next I frame can be decoded, overlaid with graphics, and re-encoded. The number of bits allocated to this overlaid I frame can be relatively large, governed by the amount of space in the digital television's decoder buffer as indicated by the buffer occupancy model. As an alternative to over-laying graphics on the original video in the I frame, selected macroblocks of the original video may be deleted and replaced with intra coded graphics macroblocks.

If desired, the "freeze" can last for more than one GOP so as to open up even more space in the digital television's decoder buffer.

MPEG Downsampling Method

This method continuously displays the original video in a subsampled manner as a small window on top of full screen displays. The original MPEG video is decoded, subsampled, and squeezed down to a small size. These operations can be done with a standard MPEG decoder followed by filtering and downsampling or alternatively can be achieved with a modified lower cost MPEG decoder that directly produces a downsampled image (referred to as MPEG downconversion or all format decoding according to several published methods). Then, in the spatial domain, this downsampled image is placed on top or transparently mixed with the desired on-screen display. This combination is then MPEG encoded. The encoding is constrained by the number of bits in the original video frames. This encoding should be achievable because the locally encoded frames consist of a small, less detailed version of the original video on top of a static background.

Locally generated I, P, and B frames respectively replace original I, P, and B frames. The time base (PCR/PTS) of the original video is transferred to the locally generated video as in Level 2. Each locally generated frame is less than or equal to the size of the frame it replaces with any difference made up in null transport packets as explained in the previous methods. Alternatively, a simplified encoder could be used that replaces P and B frames with only P frames and also encodes with motion vectors always set equal to zero (without motion compensation).

Figure 10:
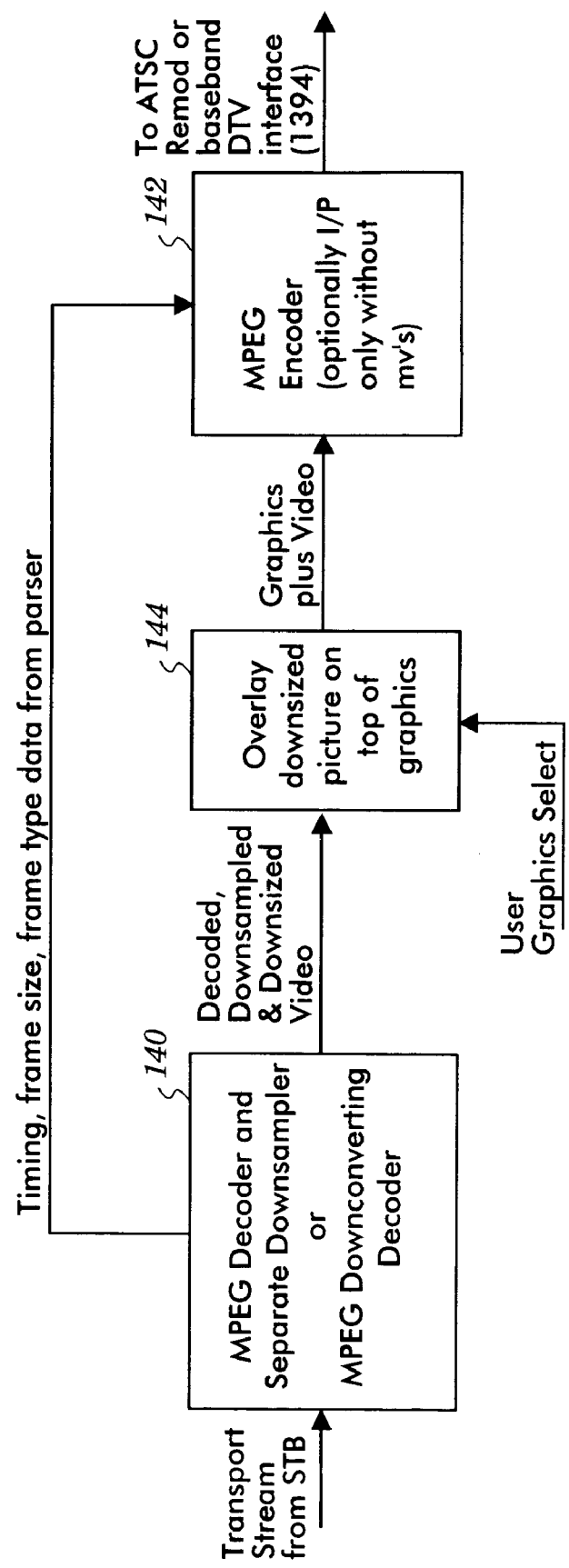

Accordingly, as shown in FIG. 10, an MPEG decoder and downsampler 140 decodes the incoming MPEG video. The timing, frame size, and type information is extracted (as in Level 2) and sent to an MPEG encoder 142. The decoded video is downsampled (this downsampling can optionally be inherent in the decoding process) and arranged to be displayed as a small window. In a block 144, this window is overlaid on top of the locally generated screen graphics. The locally generated screen graphics overlaid with the small window is then fed to the MPEG encoder 144 which encodes the video as described above, constrained by the timing and frame data from the decoder.

Certain modifications of the present invention have been discussed above. Other modifications will occur to those practicing in the art of the present invention. For example, as described above, the Advanced Television Closed Captioning standard (EIA-IS 708) is utilized in Level 1. Instead, graphics overlaid on a solid color background may be provided using other techniques.

Also, the features of Level 2 can be used with a solid color background encoded with the on-screen display and the features of Level 1 can be used with the on-screen display overlaid on video.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. An MPEG on-screen display coder comprising:
   a buffer arranged to receive and buffer an MPEG transport data stream containing frames of a selected program and frames of a non-selected program;
   an MPEG encoder arranged to encode frames of the selected program with an on-screen display; and,
   a multiplexer arranged to selectively pass to a digital television receiver the frames of the non-selected program, the encoded frames of the selected program, and original frames of the selected program, wherein the MPEG encoder is arranged to supply I frame markers, and wherein the multiplexer is controlled in response to the I frame markers so as to begin supplying encoded frames to the digital television receiver with one I frame and to resume supplying the original frames of the selected program to the digital television receiver with another I frame.

2. The MPEG on-screen display coder of claim 1 wherein the encoded frames have a time base which is slaved to the original frames of the selected program.

3. The MPEG on-screen display coder of claim 1 wherein the MPEG encoder is arranged to calculate a video hold off time dependent upon a number of frames in a decoder buffer of the digital television receiver and to use the video hold off time so as to prevent overflow of the decoder buffer.

4. The MPEG on-screen display coder of claim 1 wherein the MPEG encoder is arranged to supply a video I frame marker and an on-screen display I frame marker, wherein the multiplexer is controlled in response to the on-screen display I frame marker so as to begin supplying encoded frames to the digital television receiver with one I frame, and wherein the multiplexer is controlled in response to the video I frame marker so as to resume supplying the original frames of the selected program to the digital television receiver with another I frame.

5. The MPEG on-screen display coder of claim 4 wherein the MPEG encoder supplies the on-screen display I frame marker when the MPEG encoder generates an encoded I frame, and wherein the MPEG encoder signals the video I frame marker when an original I frame of the selected program is received.

6. The MPEG on-screen display coder of claim 1 wherein the on-screen display is overlaid on a solid color background.

7. The MPEG on-screen display coder of claim 1 wherein the on-screen display is overlaid on video.

8. The MPEG on-screen display coder of claim 1 wherein the MPEG encoder is arranged to pass unchanged I frames.

9. The MPEG on-screen display coder of claim 8 wherein the MPEG encoder is arranged to encode a first P frame by predicting the first P frame from a preceding I frame with residuals in the predicted first P frame containing the on-screen display and with motion vectors set equal to zero, and wherein the MPEG encoder is arranged to encode subsequent P frames based upon the predicted first P frame with residuals and motion vectors set equal to zero.

10. The MPEG on-screen display coder of claim 9 wherein the MPEG encoder is arranged to supply first and second I frame markers, wherein the multiplexer is controlled in response to the first I frame marker so as to begin supplying the encoded frames to the digital television receiver with one I frame, and wherein the multiplexer is controlled in response to the second I frame marker so as to resume supplying the original frames of the selected program to the digital television receiver with another I frame.

11. The MPEG on-screen display coder of claim 1 wherein the MPEG encoder is arranged to encode I frames with the on-screen display.

12. The MPEG on-screen display coder of claim 11 wherein the MPEG encoder is arranged to encode subsequent P frames by prediction based upon the encoded I frames with residuals and motion vectors set equal to zero.

13. The MPEG on-screen display coder of claim 12 wherein the MPEG encoder is arranged to supply first and second I frame markers, wherein the multiplexer is controlled in response to the first I frame marker so as to begin supplying the encoded frames to the digital television receiver with one I frame, and wherein the multiplexer is controlled in response to the second I frame marker so as to resume supplying the original frames of the selected program to the digital television receiver with another I frame.

14. The MPEG on-screen display coder of claim 1 wherein the MPEG encoder is arranged to generate an I frame having a solid color background and an on-screen display, and wherein the MPEG encoder generates a P frame predicted from the I frame with zero residual.

15. The MPEG on-screen display coder of claim 1 wherein the MPEG encoder is arranged to encode frames with the on-screen display by prediction with non-zero motion vectors in order to encode animated graphics.

16. The MPEG on-screen display coder of claim 1 wherein the MPEG encoder is arranged to pass a first I frame without modification, to predict subsequent P frames based upon the first I frame, to overlay the on-screen display on a second I frame, and to predict subsequent P frames based upon the second I frame.

17. The MPEG on-screen display coder of claim 1 wherein the MPEG encoder is arranged to encode frames by mixing original video of the selected program in a window of reduced size with the on-screen display.

18. The MPEG on-screen display coder of claim 1 wherein the multiplexer is arranged to add make-up packets to each encoded frame as necessary to ensure that each encoded frame has as many transport packets as an original frame of the selected program.

19. The MPEG on-screen display coder of claim 18 wherein the make-up packets are null packets.

20. The MPEG on-screen display coder of claim 18 wherein the make-up packets are Program Map Table packets.

21. The MPEG on-screen display coder of claim 1 wherein the buffer comprises a delay buffer arranged to delay the MPEG transport data stream by an amount of time commensurate with an amount of time required by the MPEG encoder to encode the frames of the selected program with an on-screen display.

22. An MPEG on-screen display coder comprising:
   a demultiplexer arranged to demultiplex frames of a selected video program from frames of a non-selected program in a transport stream;

an MPEG encoder arranged to receive the frames of the selected program and to process the frames of the selected program so as to encode frames with an on-screen display; and, a multiplexer arranged to multiplex the encoded frames with the frames of the non-selected video program in the transport stream, wherein the MPEG encoder is arranged to supply I frame markers, and wherein the multiplexer is controlled in response to the I frame markers so as to begin supplying encoded frames to the digital television receiver with one I frame and to resume supplying the original frames of the selected program to the digital television receiver with another I frame.

23. The MPEG on-screen display coder of claim 22 wherein the encoded frames have a time base which is slaved to the original frames of the selected program.

24. The MPEG on-screen display coder of claim 22 wherein the MPEG encoder is arranged to calculate a video hold off time dependent upon a number of frames in a decoder buffer of the digital television receiver and to use the video hold off time so as to prevent overflow of the decoder buffer.

25. The MPEG on-screen display coder of claim 22 wherein the MPEG encoder is arranged to supply a video I frame marker and an on-screen display I frame marker, wherein the multiplexer is controlled in response to the on-screen display I frame marker so as to begin supplying encoded frames to the digital television receiver with one I frame, and wherein the multiplexer is controlled in response to the video I frame marker so as to resume supplying the original frames of the selected program to the digital television receiver with another I frame.

26. The MPEG on-screen display coder of claim 25 wherein the MPEG encoder supplies the on-screen display I frame marker when the MPEG encoder generates an encoded I frame, and wherein the MPEG encoder signals the video I frame marker when an original I frame of the selected program is received.

27. The MPEG on-screen display coder of claim 22 wherein the on-screen display is overlaid on a solid color background.

28. The MPEG on-screen display coder of claim 22 wherein the on-screen display is overlaid on video.

29. The MPEG on-screen display coder of claim 22 wherein the MPEG encoder is arranged to pass unchanged I frames.

30. The MPEG on-screen display coder of claim 29 wherein the MPEG encoder is arranged to encode a first P frame by predicting the first P frame from a preceding I frame with residuals in the predicted first P frame containing the on-screen display and with motion vectors set equal to zero, and wherein the MPEG encoder is arranged to encode subsequent P frames based upon the predicted first P frame with residuals and motion vectors set equal to zero.

31. The MPEG on-screen display coder of claim 30 wherein the MPEG encoder is arranged to supply first and second I frame markers, wherein the multiplexer is controlled in response to the first I frame marker so as to begin supplying the encoded frames to the digital television receiver with one I frame, and wherein the multiplexer is controlled in response to the second I frame marker so as to resume supplying the original frames of the selected program to the digital television receiver with another I frame.

32. The MPEG on-screen display coder of claim 22 wherein the MPEG encoder is arranged to encode I frames with the on-screen display.

33. The MPEG on-screen display coder of claim 32 wherein the MPEG encoder is arranged to encode subsequent P frames by prediction based upon the encoded I frames with residuals and motion vectors set equal to zero.

34. The MPEG on-screen display coder of claim 33 wherein the MPEG encoder is arranged to supply first and second I frame markers, wherein the multiplexer is controlled in response to the first I frame marker so as to begin supplying the encoded frames to the digital television receiver with one I frame, and wherein the multiplexer is controlled in response to the second I frame marker so as to resume supplying the original frames of the selected program to the digital television receiver with another I frame.

35. The MPEG on-screen display coder of claim 22 wherein the MPEG encoder is arranged to generate an I frame having a solid color background and an on-screen display, and wherein the MPEG encoder generates a P frame predicted from the I frame with zero residual.

36. The MPEG on-screen display coder of claim 22 wherein the MPEG encoder is arranged to encode frames with the on-screen display by prediction with non-zero motion vectors in order to encode animated graphics.

37. The MPEG on-screen display coder of claim 22 wherein the MPEG encoder is arranged to pass a first I frame without modification, to predict subsequent P frames based upon the first I frame, to overlay the on-screen display on a second I frame, and to predict subsequent P frames based upon the second I frame.

38. The MPEG on-screen display coder of claim 22 wherein the MPEG encoder is arranged to encode frames by mixing original video of the selected program in a window of reduced size with the on-screen display.

39. The MPEG on-screen display coder of claim 22 wherein the multiplexer is arranged to add make-up packets to each encoded frame as necessary to ensure that each encoded frame has as many transport packets as an original frame of the selected program.

40. The MPEG on-screen display coder of claim 39 wherein the make-up packets are null packets.

41. The MPEG on-screen display coder of claim 39 wherein the make-up packets are Program Map Table packets.

42. The MPEG on-screen display coder of claim 22 further comprising a buffer, wherein the buffer is arranged to receive and buffer the transport stream, and wherein the buffer is arranged to delay the transport stream by an amount of time commensurate with an amount of time required by the MPEG encoder to encode the frames of the selected program with the on-screen display.

43. The MPEG on-screen display coder of claim 1 wherein the MPEG encoder is arranged to encode frames of only the selected program with the on-screen display.

* * * * *